Patented Sept. 26, 1922.

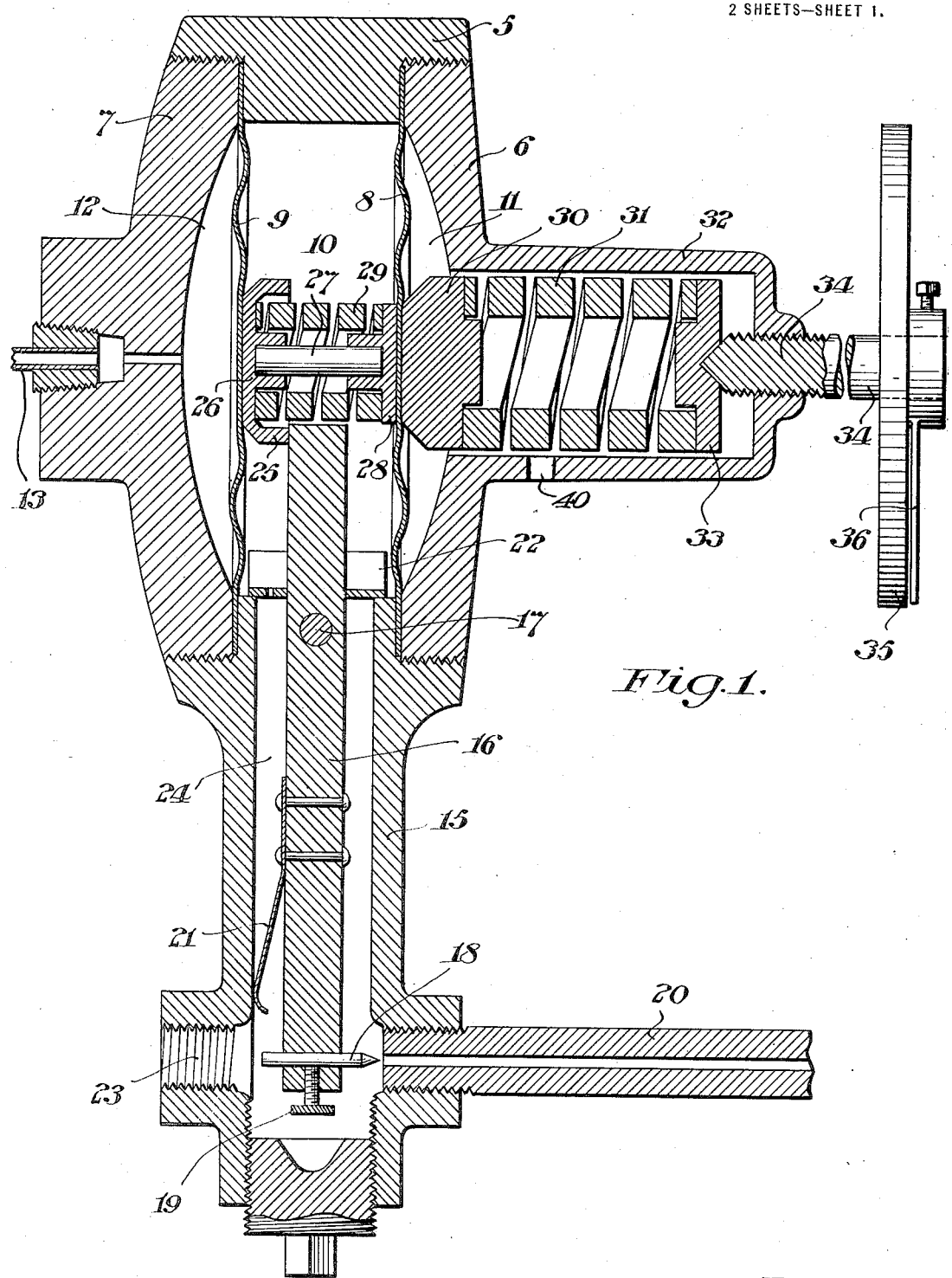

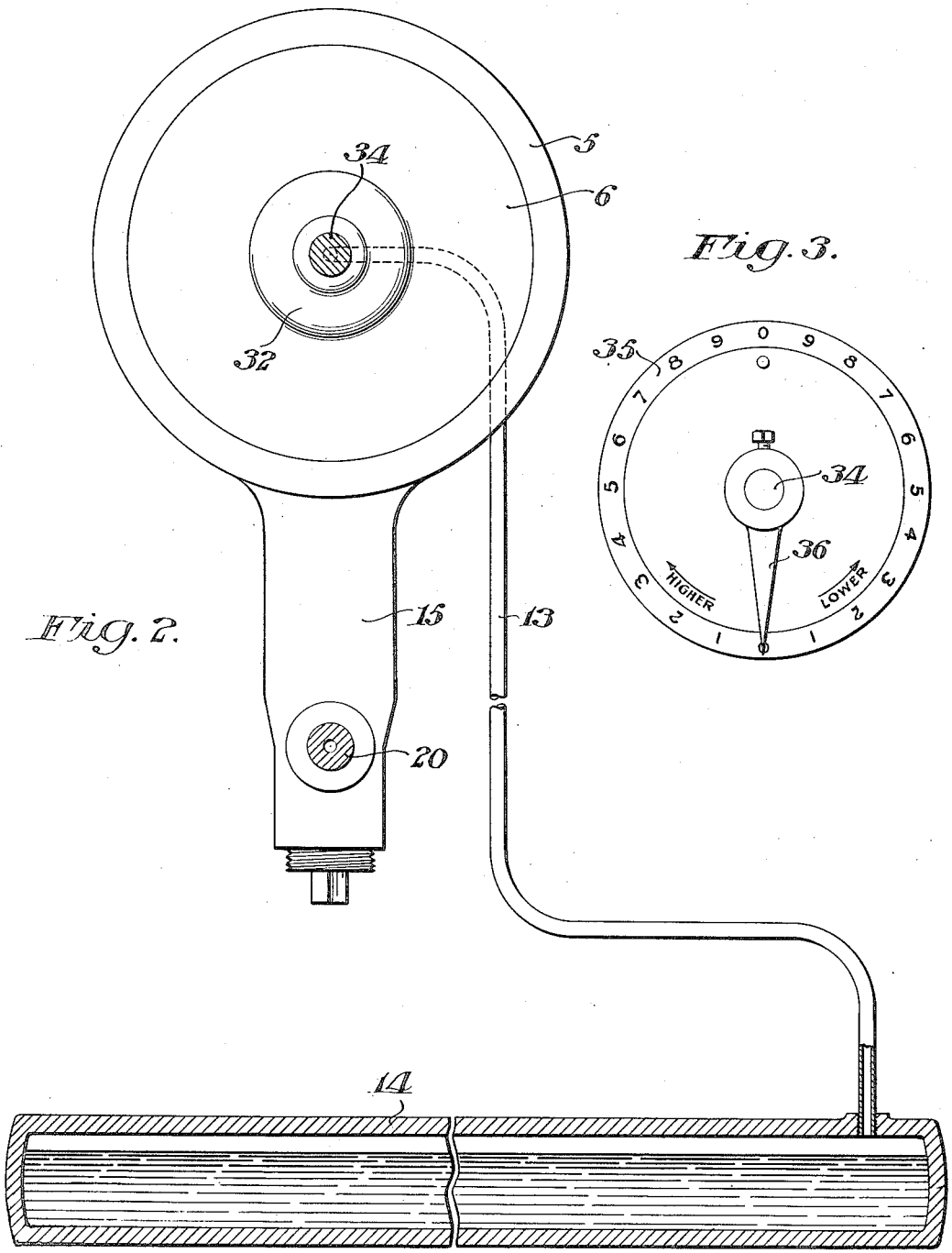

1,429,923

UNITED STATES PATENT OFFICE.

ADOLPHE E. BOSSÉ, OF ARDEN, DELAWARE, AND CLARENCE W. FORD, OF PHILADELPHIA, PENNSYLVANIA, ASSIGNORS TO BOSSÉ-FORD COMPANY, OF PHILADELPHIA, PENNSYLVANIA, A CORPORATION OF MARYLAND.

TEMPERATURE REGULATING VALVE.

Application filed February 7, 1920. Serial No. 357,103.

*To all whom it may concern:*

Be it known that we, ADOLPHE E. BOSSÉ, a citizen of the United States, residing at Arden, in the county of New Castle and State of Delaware, and CLARENCE W. FORD, a citizen of the United States, residing at Philadelphia, in the county of Philadelphia and State of Pennsylvania, have jointly invented certain new and useful Improvements in Temperature-Regulating Valves, of which the following is a specification.

Our invention relates to temperature regulating valves, and it has particular relation to a device adapted to automatically regulate and control the temperature in refrigerating apparatus. Our invention, more specifically considered, relates to apparatus for controlling the expansion of the anhydrous ammonia, or other active refrigerating agent, in refrigerating systems through the variations in temperature of the circulating brine, or the cooling or freezing room, as the case may be, and being so constructed and arranged to operate to maintain the temperature substantially constant notwithstanding variations in back pressure in the expansion lines.

The object of our invention is to provide a simple and efficient device for regulating the passage of a refrigerating fluid by means of variations in temperature of the medium acted upon by said refrigerating fluid, which device will be automatic in its action and which will operate substantially constant notwithstanding variations in back pressure of the refrigerating fluid which would otherwise tend to render the automatic control ineffective. A further object of our invention is to provide in such a device, certain improved details of construction whereby the same will be rendered more certain in its action.

The nature and characteristic features of our invention will be more readily understood from the following description, taken in connection with the accompanying drawings forming part hereof, in which:

Figure 1 is a vertical central sectional view of a temperature regulating valve embodying the main features of our present invention;

Figure 2 is an end elevation thereof, on a reduced scale, the same being shown connected to means adapted to be mounted in a chamber or tank, the temperature of the contents of which are to be maintained substantially constant; and Figure 3 is an elevational view of a dial and its associated parts forming part of the apparatus, and adapted for facilitating minor adjustment of the apparatus.

Referring to the drawings, in the particular embodiment of our invention there shown, 5 is an annular housing or casing having heads 6 and 7 mounted therein by means of suitable screw-threads. The heads 6 and 7 serve to maintain flexible diaphragms 8 and 9 in place within the housing or casing 5, these diaphragms 8 and 9 dividing the interior of the housing 5 into a central chamber 10, a chamber 11 on one side thereof, and a chamber 12 on the other side thereof. The central chamber 10 is in communication, as hereinafter more fully set forth, with the low pressure side of the refrigerating system. The chamber 11 is in communication with the external atmosphere, and is consequently at atmospheric pressure, for which purpose an aperture 40 may, if desired, be provided in any suitable portion of the head member 6. The chamber 12 is in communication by means of a pipe 13 with a closed container 14, which holds a certain quantity of anhydrous ammonia, or other similar liquid having a low boiling point. The container 14 is normally located within the brine tank, or within the cooling or freezing chamber of the refrigerating system, so that the pressure within the chamber 12 will be determined by the pressure due to the temperature of the liquid of low boiling point contained within the container 14.

Depending from the casing 5 is a hollow extension 15, within which a lever 16 is mounted. The lever 16 is pivoted on a pin 17, mounted in the housing or casing 5. The lower end of the lever 16 carries a needle or pin 18 which is adjustably secured therein by means of a screw 19. The needle 18 has a tapered point which is adapted to be seated in the end of a pipe 20. The liberation and expansion of the anhydrous ammonia of the refrigerating system is controlled by said needle 18. The lever 16 is normally actuated to close the needle 18 on the seat at the end of the anhydrous ammonia pipe 20 by means of a leaf spring 21 which is carried by lever 16, and which is secured thereto in any suitable manner. The upper end of the lever 16 extends through a baffle plate 22, which baffle plate serves to prevent violent fluctuations in pressure within the chamber 10 when such fluctuations occur on the low pressure side of the refrigerating system. The low pressure side of the refrigerating system is in communication with the chamber 10 through the connection nipple 23 and the hollow interior 24 of the extension 15 of casing 5. The upper end of the lever 16 normally bears against a ledge 25 of a member 26 which is seated on the central interior surface of the flexible diaphragm 9, so that the lever 16 is adapted, by means of the spring 21, to seat the needle 18 on the end of the anhydrous ammonia pipe 20 when the diaphragm 9 is actuated away from the central portion of the chamber 10.

The member 26 also supports one end of a pin 27, the other end of which is seated in a member 28 which bears against the inner central surface of the other flexible diaphragm 8. The pin 27 is loosely mounted in the members 26 and 28 and serves to limit the extent to which the diaphragms 8 and 9 may be permitted to approach each other and causes the same to be operated in unison under certain conditions as will hereinafter be more fully described. A coil spring 29, seated at its respective ends in members 26 and 28, tends to separate the diaphragms 8 and 9 and thereby expand the central chamber 10 under certain conditions, as will later appear.

On the outer side of the flexible diaphragm 8, that is on the side towards the chamber 11, which as before stated is maintained at atmospheric pressure, there is mounted a member 30 which bears against the central outer surface of said flexible diaphragm 8, and forms a seat for one end of a strong coil spring 31 which is mounted within an extension 32 of the head member 6. The other end of the coil spring 31 is seated in a member 33, the outer central portion of which is engaged by the point of an adjusting screw 34, which is threaded in the outer end of the extension 32 of the head member 6. The adjusting screw 34 extends outward to any convenient location and extends through a dial plate 35 which is suitably graduated on its outer surface by a series of indicating numerals (see Fig. 3). The outer end of the adjusting screw 34 carries a pointer 36 which is adapted to indicate, in conjunction with the numerals on the dial plate 35, the extent of minor adjustment of said screw 34. It will be noted that as the screw 34 is turned in one direction or the other, the degree of tension of the coil spring 31 will be varied.

The operation of the apparatus may now be explained. As before indicated, the anhydrous ammonia, or other active medium of the refrigerating system proper passes from the source of supply through the pipe 20, the outlet or expansion thereof and is controlled by the needle 18 which is located adjacent the end of said pipe 20, the spring 21 normally tending to close the needle 18 on this seat. The movement of the lever 16 is controlled however, by the movement of the member 26, as the upper end of said lever bears against the ledge 25 thereof. Considering, for an example, that the pressure on the low pressure side of the refrigerating system is subnormal and that the temperature of the medium in which the container 14 is located is above normal; this will cause a rise in pressure in the chamber 12, and consequently the diaphragm 9 will be dilated towards the center of the casing 5, causing the lever 16 to be actuated to cause the needle 18 to be moved and held in the open position, as shown in Fig. 1 of the drawings, and permitting a quantity of the active medium of the refrigerating system to expand or pass from the supply pipe 20.

When the temperature of the medium in which the container 14 is located falls to the required degree, the diaphragm 9 will be dilated in the opposite direction, due to the tension of the coil spring 31 acting through member 30, diaphragm 8, member 28, pin 27 and member 26, and in this case the lever 16 will be caused, through spring 21 to close the valve needle 18 on its seat and thus shut off the supply of the active refrigerating medium.

Should, however, the back pressure in the low pressure side rise to an improper amount, said pressure will cause the diaphragms 8 and 9 to be dilated with respect to each other, this action being facilitated by the coil spring 29, and the needle 18 will consequently be caused to close off the supply of the active refrigerating medium until said back pressure is reduced to the point where the refrigerating system will properly function.

It will of course be understood that the apparatus will operate in a substantially constant manner, and that the tension of the several coil springs 29 and 31 is so arranged that the respective pressures in the chambers 10, 11 and 12 will so co-ordinate whereby the temperature of the medium in which the container 14 is located will be maintained substantially constant.

Having thus described the nature and characteristic features of our invention, what we claim as new and desire to secure by Letters Patent is—

1. A device of the character described comprising a housing, a pair of flexible diaphragms dividing the interior of said housing into three chambers, means limiting the extent of approach of said diaphragms towards each other, means mounted in one of the outer chambers bearing against the outer side of one of said diaphragms tending to dilate the same towards the central chamber, fluid pressure means connected with the other outer chamber tending to dilate the other diaphragm towards the central chamber, and a valve needle actuated by one of said diaphragms adapted to control the flow of a refrigerating medium, said valve needle being mounted in a chamber communicating with the chamber between said diaphragms.

2. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, and a valve needle actuated by one of said diaphragms adapted to control the flow of a refrigerating medium, said valve needle being mounted in a chamber communicating with the chamber between said diaphragms.

3. A device of the character described comprising a housing, a pair of flexible diaphragms dividing the interior of said housing into three chambers, means mounted in the central chamber between and bearing against said diaphragms tending to dilate the same with respect to each other, means coacting therewith limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, and a valve needle actuated by one of said diaphragms adapted to control the flow of a refrigerating medium, said valve needle being mounted in a chamber communicating with the chamber between said diaphragms.

4. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, means for varying the pressure of said spring means, fluid pressure means connected with the other outer chamber tending to dilate the other diaphragm towards the central chamber, and a valve needle actuated by one of said diaphragms adapted to control the flow of a refrigerating medium, said valve needle being mounted in a chamber communicating with the chamber between said diaphragms.

5. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, means for adjusting the pressure of said spring means, means for indicating the extent of the adjustment, fluid pressure means connected with the other outer chamber tending to dilate the other diaphragms towards the central chamber, and a valve needle actuated by one of said diaphragms adapted to control the flow of a refrigerating medium, said valve needle being mounted in a chamber communicating with the chamber between said diaphragms.

6. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, and a valve needle actuated by one of said diaphragms adapted to control the flow of a refrigerating medium, the fluid pressure means connected with said outer chamber comprising a closed container mounted in the medium the temperature of which is to be controlled and containing a quantity of liquid of low boiling point.

7. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, a lever mounted in the central chamber adapted to be actuated in unison with one of said diaphragms, and a valve needle carried by said lever adapted to control the flow of a refrigerating medium, said valve needle being mounted in a chamber communicating with the central chamber.

8. A device of the character described comprising a housing, a pair of flexible diaphragms dividing the interior of said housing into three chambers, means limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, a valve needle adapted to control the flow of a refrigerating medium, a lever carrying said valve needle, a spring actuating said lever to close said valve needle on its seat, and means connected with one of said diaphragms to actuate said lever to raise said valve needle from its seat, the aforesaid valve mechanism being mounted in a chamber communicating with the central chamber.

9. A device of the character described comprising a housing, a pair of flexible diaphragms dividing the interior of said housing into three chambers, means mounted in the central chamber between and bearing against said diaphragms tending to dilate the same with respect to each other, means coacting therewith limiting the extent of approach of said diaphragms towards each other, spring means mounted in one of the outer chambers bearing against the outer side of one of said diaphragms tending to dilate the same towards the central chamber, fluid pressure means connected with the other outer chamber tending to dilate the other diaphragm towards the central chamber, a valve needle adapted to control the flow of a refrigerating medium, a lever carrying said valve needle, a spring actuating said lever to close said valve needle on its seat, and means connected with one of said diaphragms to actuate said lever to raise said valve needle from its seat the aforesaid valve mechanism being mounted in a chamber communicating with the central chamber.

10. A device of the character described comprising a housing, a pair of flexible diaphragms dividing the interior of said housing into three chambers, spring means mounted in the central chamber between and bearing against said diaphragms tending to dilate the same with respect to each other, means coacting therewith limiting the extent of approach of said diaphragms towards each other, spring means mounted in one of the outer chambers bearing against the outer side of one of said diaphragms tending to dilate the same towards the central chamber, means for varying the pressure of said spring means, fluid pressure means connected with the other outer chamber tending to dilate the other diaphragm towards the central chamber, a valve needle adapted to control the flow of a refrigerating medium, a lever carrying said valve needle, a spring actuating said lever to close said valve needle on its seat, and means connected with one of said diaphragms to actuate said lever to raise said valve needle from its seat, the aforesaid valve mechanism being mounted in a chamber communicating with the central chamber.

In testimony whereof we have hereunto signed our names.

ADOLPHE E. BOSSÉ.
CLARENCE W. FORD.